United States Patent [19]

Phillips et al.

[11] Patent Number: 4,740,794
[45] Date of Patent: Apr. 26, 1988

[54] CONNECTORLESS ANTENNA COUPLER

[75] Inventors: James P. Phillips, Lake in the Hills; Robert A. Gunther, Elmwood Park, both of Ill.

[73] Assignee: Motorola, Inc., Schaumburg, Ill.

[21] Appl. No.: 816,025

[22] Filed: Jan. 3, 1986

[51] Int. Cl.[4] .............................................. H01Q 1/24
[52] U.S. Cl. .................................... 343/702; 343/829; 343/841; 455/90; 455/300
[58] Field of Search ............... 343/702, 718, 905, 724, 343/906, 789, 790, 825, 841, 828–830, 846, 872, 850, 851, 826; 333/12, 27, 219, 220, 222; 455/89, 90, 300

[56] References Cited

U.S. PATENT DOCUMENTS

| | | | |
|---|---|---|---|
| 2,790,899 | 4/1957 | Townsend | 343/720 |
| 3,230,533 | 1/1966 | Brill | 343/702 |
| 3,364,487 | 1/1968 | Maheux | 455/300 |
| 3,736,591 | 5/1973 | Rennels et al. | 343/702 |
| 3,778,836 | 12/1973 | Tanaka | 343/702 |
| 3,946,392 | 3/1976 | Whitman | 343/830 |
| 3,980,952 | 9/1976 | Rapshys | 325/16 |
| 4,115,783 | 9/1978 | Reggia | 343/792 |
| 4,313,119 | 1/1982 | Garay et al. | 343/702 |
| 4,395,713 | 7/1983 | Nelson et al. | 343/713 |
| 4,491,843 | 1/1985 | Boubouleix | 343/702 |
| 4,612,668 | 9/1986 | Sarac | 343/702 |
| 4,672,685 | 6/1987 | Phillips et al. | 343/702 |

Primary Examiner—William L. Sikes
Assistant Examiner—Michael C. Wimer
Attorney, Agent, or Firm—Charles L. Warren

[57] ABSTRACT

A metal shield is dimensioned to enclose a portion of a portable radio having an internal antenna and a first transmission line. A transmission line mounted in the shield is positioned to be adjacent to the first transmission line when the shield engages the radio and permits energy to be coupled between the resonator and the first transmission line. The first transmission line and the shield are dimensioned so that the electrical length of the first transmission line increases to 2L when the shield engages the radio, where L is the electrical length of the first transmission line when the shield does not engage the radio. This electrical length transformation by an integral multiple of one half wavelength helps to maintain the input impedance to the internal antenna.

18 Claims, 5 Drawing Sheets

CONNECTORLESS ANTENNA COUPLER

BACKGROUND OF THE INVENTION

This invention is directed generally to couplers which permit a remote antenna to be coupled to a radio which has a self contained antenna. This invention is more specifically directed to a coupler which simultaneously disables an internal antenna while efficiently coupling the radio to an external antenna without mechanical switches.

Portable two-way radios and pagers normally have an attached antenna which may be an external monopole or an antenna disposed within the housing of the radio, i.e., a so-called hidden antenna. It may be desirable to increase the effective range of such a radio by connecting it to an external antenna. For example, it is generally known that it is more difficult to communicate with a portable radio or pager which is located in a building having a substantial metal structure or in a vehicle. An external antenna located outside the building or vehicle would greatly improve the communication range of such a radio.

The conventional means for connecting an external antenna to a radio is by a jack or coaxial connector mounted to the radio. Problems associated with direct metal to metal mechanical contacts which carry R.F. current are well-known.

A hidden internal antenna has certain advantages as compared with an external antenna. An internal antenna makes the radio less awkward to use and the possibility of damage to an external antenna is eliminated. Such an internal antenna is disclosed in U.S. Pat. No. 4,571,595 entitled DUAL BAND TRANSCEIVER ANTENNA. Although internal antennas have certain advantages, the range of a radio utilizing an internal antenna is typically less than that for a comparable radio utilizing an external antenna which is often substantially larger. Therefore it is desirable, especially with respect to internal antennas, to have the capability of extending the range of the radio by means of a remotely mounted antenna Where a remote antenna is to be coupled to a radio, some means is normally provided to disengage the attached or internal antenna when the remote antenna is in use. A conventional means for disabling an internal antenna is to utilize a mechanical jack or associated switch to disengage the attached antenna circuit when the remote antenna connector is inserted into the jack. Such mechanical assemblies suffer from problems associated with direct metal to metal connections especially where RF energy is being transferred.

SUMMARY OF THE INVENTION

It is an object of this invention to provide an improved remote antenna coupler for a portable radio which does not use a direct mechanical connection with the antenna circuit of the radio.

An embodiment of the invention includes a metal shield dimensioned to receive a portion of a radio, a resonator located within said shield and a coaxial cable coupled to the resonator. That portion of the radio enclosed by the shield contains the active antenna (radiating element portions) of an internal antenna and a transmission line means which is disposed adjacent the housing of the radio to enhance coupling to the resonator disposed within the shield. The resonator preferably comprises another transmission line means which is disposed adjacent the transmission line means within the radio such that RF energy is coupled between the transmission lines when the shield engages the radio. The shield prevents radiation from the internal antenna. The transmission line in the radio is dimensioned to have a first electrical length when the shield is not engaging the radio and a second electrical length when the shield engages the radio. The internal transmission line is configured such that its phase velocity halves with the shield engaged. The wavelength mode of the transmission line within the radio and the transmission line within the shield operate at the same wavelength mode. This mode of operation enhances the coupling efficiency and minimizes impedance changes at the inputs of the internal antenna due to the engagement of the coupler.

DETAILED DESCRIPTION

Figure 1:
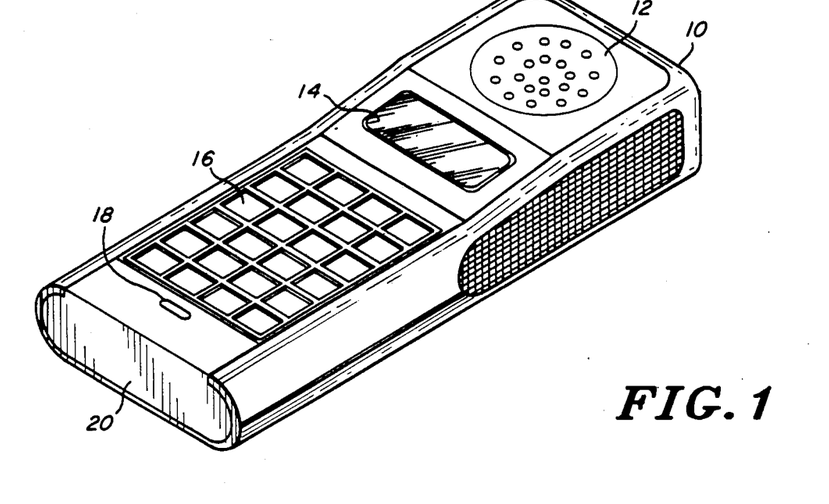
FIG. 1 is a perspective view of a hand-held two-way radio which utilizes an antenna according to the present invention.

FIG. 1 illustrates a hand-held two-way radio 10 having a speaker 12, a visual display 14, an input keypad 16, and a microphone port 18. An internal antenna according to the present invention is located in the bottom 20 portion of radio 10. Since an internal antenna is used, it will be apparent that the portion of the housing of radio 10 in the vicinity of the antenna should be made of a material which does not substantially interfere with the ability of the antenna to radiate and receive radio frequency energy.

Figure 2:
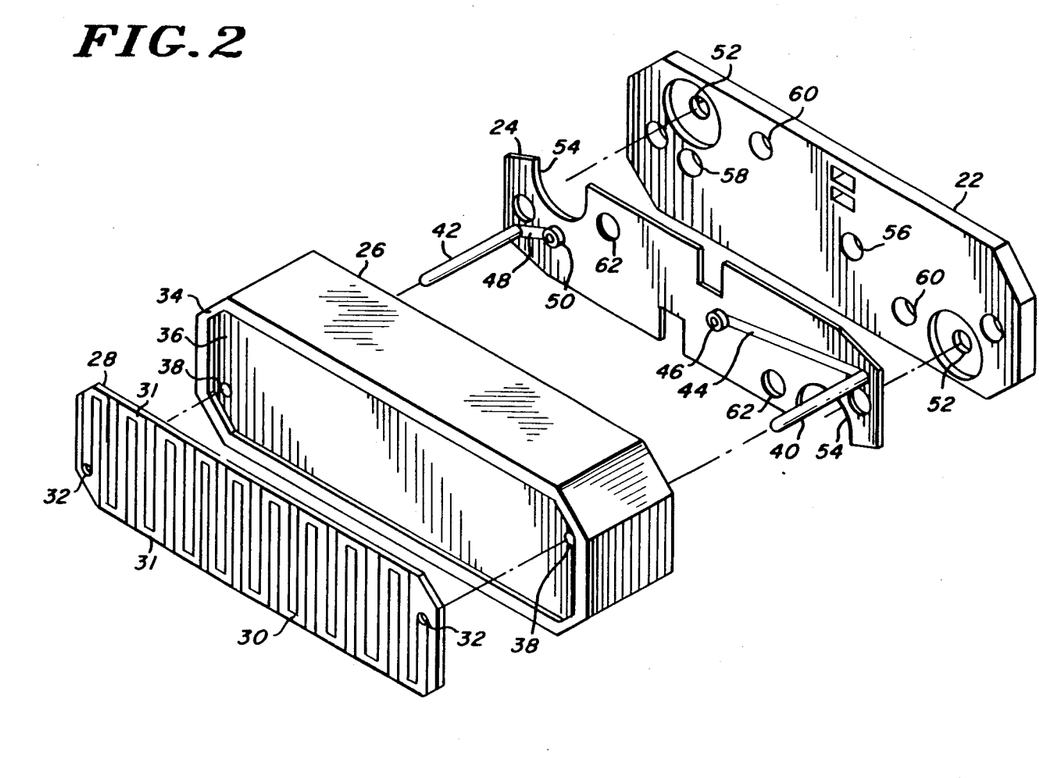
FIG. 2 illustrates an exploded view of the antenna according to the present invention.

FIG. 2 illustrates an embodiment of an internal antenna according to the present invention which is located at the bottom 20 of radio 10. The major elements shown in FIG. 2 include a metal mounting plate 22, printed circuit board 24, a plastic spacer 26 and printed circuit board 28.

A serpentine copper pattern 30 extends between holes 32 in printed circuit board 28. The printed circuit board is dimensioned to fit within the peripheral lip 34 on spacer 26 against surface 36. Holes 38 extend through spacer 26 and are in alignment with holes 32.

Metal rods 40 and 42 which comprise the radiating elements of the antenna are mounted to board 24 and are aligned to project through holes 38 and 32. The distal ends of rods 40 and 42 are soldered to the respective ends of the serpentine pattern 30 on board 28. The attached end (base) of rod 40 is connected to a receptacle 46 by a conductor 44 on the surface of board 24. Similarly, the attached end of rod 42 is connected to receptacle 50 by a conductor 48. Holes in the board 24 aligned with receptacles 46 and 50 permit connections to be made with each from the side of the board not seen in FIG. 2.

Metal plate 22 has two holes 52 which are countersunk. These holes permit the plate 22 to be secured to the chassis of radio 10 by screws. Cutout portions 54 in board 24 align with the countersunk areas surrounding holes 52 to provide clearance for mounting screws. Holes 56 and 58 in plate 22 are aligned respectively with receptacles 46 and 50. These holes provide clearance permitting projecting pins from radio 10 to engage receptacles 46 and 50. Tapped holes 60 in plate 22 are aligned with holes 62 in board 24 and enable the board to be mounted to the plate by means of screws.

The elements as seen in FIG. 2 interact to provide the following functions. Plate 22 serves as a ground plane. Conductors 44 and 48 in combination with the ground plane form transmission lines which connect rods 40 and 42 to receptacles 46 and 50. The rods 40 and 42 form the radiating portions of the antenna structure. The serpentine pattern 30 on printed circuit board 28 cooperates with the ground plane to form a transmission line which connects the radiating elements 40 and 42.

Figure 3:
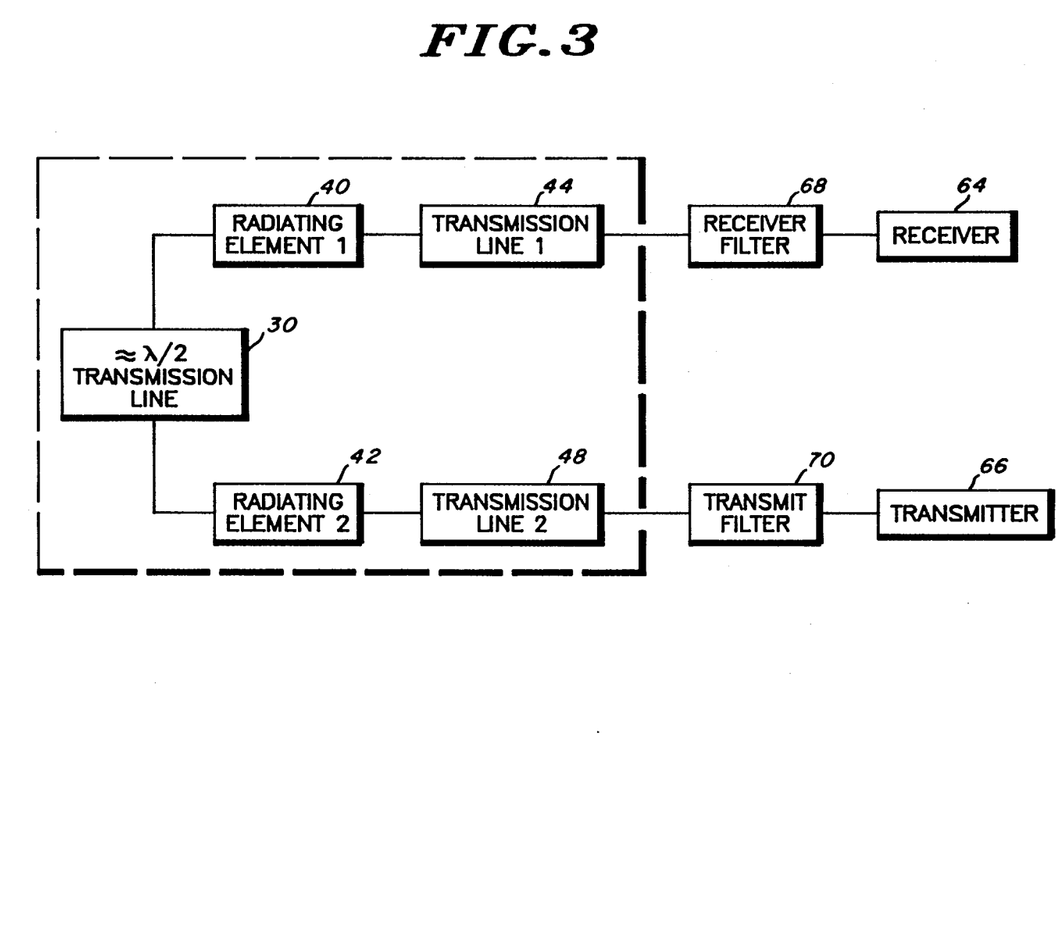
FIG. 3 is a block diagram illustrating the present invention as coupled to a two-way radio.

In the diagram of FIG. 3 the box formed by dashed lines represents the antenna elements as seen in FIG. 2. Separate antenna inputs are provided by transmission lines 44 and 48. A receiver 64 is connected through a bandpass receive filter 68 to transmission line 44. The transmitter 66 is connected through bandpass filter 70 to transmission line 48. The transmission lines 44 and 48 are connected respectively to the radiating elements 40 and 42 which are in turn connected together by the approximate one half wavelength transmission line 30. The receiver, transmitter, and the respective filters are conventional.

Normally the receiver input and the transmitter output are designed for a given impedance, such as the commonly used 50 ohm impedance. The receiver receives a signal in one frequency range while the transmitter transmits a signal in another separated frequency range. The receive filter 68 presents a nominal 50 ohm impedance over the receive frequency range and presents a high reactance to frequencies in the transmit range. Similarly, the transmitter filter 70 presents a nominal 50 ohm impedance over the transmit frequency range but presents a large reactance to frequencies in the receive frequency range. The antenna according to this invention utilizes the reactance of the receive and transmit filters with respect to out of band frequencies to achieve a 50 ohm match at each input. This aspect will be explained more fully below.

The center design frequency is the geometric mean frequency of the lowest and highest frequencies. In a particular embodiment of the present invention, radiating element 40 and 42 are identical and selected to be 1/15th wavelength long at the center design frequency. However radiating elements greater than 1/20 wavelength and up to ¼ wavelength could be used. Transmission lines 44 and 48 have the same characteristic impedance, 50 ohms, as the nominal impedance of the receive and transmit filter 68 and 70, respectively. Since transmission line 30 is spaced a substantial distance with respect to ground plane 22, the characteristic impedance of transmission line 30 is substantially higher than that for transmission lines 44, 48. In the specific embodiment of the antenna, the characteristic impedance of transmission line 30 is approximately 900 ohms.

The following method can be utilized to adjust the present antenna so that its input connected to receive filter 68 provides a 50 ohm match at the receive frequencies and the input to the transmit filter 70 provides a 50 ohm match for the transmit frequency range. In this example, the radiating elements 40 and 42 are selected to be substantially identical. It has been determined that radiating elements of approximately 1/15th wavelength represent a good compromise between radiation efficiency and physical size. It will be understood of course that other lengths of radiating elements could be utilized. Elements greater than 1/20th wavelength but less than ¼ wavelength are preferred. The length of transmission line 30 is determined by providing a short circuit directly at the base of radiating element 40 and adjusting the length of the transmission line so that the impedance measured directly at the base of radiating element 42 is 50 ohms at the center design frequency.

The short circuit at the base of radiating element 40 is removed and the length of transmission line 44 is adjusted so that the impedance directly at the base of radiating element 42 is 50 ohms at the center frequency within the transmit frequency range. In the transmit frequency range the receive filter 68 presents a substantial reactance that is transformed by transmission line 44 into an appropriate reactance which is reflected through radiating element 40 and transmission line 30 to radiating element 42. The impedance coupled to radiating element 42 combines with its impedance to provide a 50 ohm termination.

A similar procedure is utilized to determine the length of transmission line 48 needed to provide a match for the receiver frequencies. Since transmission line 44 has a 50 ohm characteristic impedance, a means for measuring impedance may be utilized at the output of this transmission line rather than directly at the base of radiating element 40. With the transmit filter 70 coupled to transmitter 66 and to transmission line 48, length of the transmission line 48 is adjusted until a 50 ohm termination is provided at the output of transmission line 44 at the center frequency in the receive frequency range. The transmit filter 70 provides a substantial reactance at the center receive frequency which is transformed by transmission line 48 and coupled through radiating element 42 and transmission line 30 to radiating element 40. The impedance coupled to radiating element 40 combined with its impedance results in a 50 ohm termination to the receive filter 68. It will be understood that because both transmission lines 44 and 48 have a characteristic 50 ohm impedance, the insertion of these transmission lines between the respective radiating elements and filters maintains the desired matching impedance.

A particular application of the internal antenna is disclosed in order to provide a specific example to assist in understanding the present invention. In the particular application, the transmit frequency range is 825–845 MHz, and the the receive frequency range is 870–890 MHz. These frequency ranges result in a geometric mean (center frequency) of 856.884 MHz. Each radiating element is 0.5 inches (1.27 cm) in height and 0.05 inches (0.127 cm) in diameter. The impedance of each radiating element at the center frequency is approximately 6 ohm resistive and 40 ohms reactive (inductive). The impedance of the radiating element is influenced by several factors including uniform current distribution along the element, the relatively small ground plane provided by plate 22, and the effect of a user's hand which is normally positioned on the radio near one of the radiating elements. Transmission line 30 has a characteristic impedance of approximately 900 ohms and when adjusted in accordance with the previously described method is 0.486 wavelengths at the center frequency. Although the particular example uses a transmission line 30 of approximately ½ wavelength, a wavelength of N/2 could be used where N is a positive integer greater than zero. The receive filter 68 is a 6 pole comb line ceramic filter having a 50 ohm impedance in the receive frequency range. The transmit filter 70 is a 5 pole comb line ceramic filter having an impedance of 50 ohms in the transmit frequency range. Transmission lines 44 and 48 each have a characteristic impedance of 50 ohms.

In order to match the transmit antenna input to 50 ohms, the length of transmission line 44 was adjusted to be $0.227 + N/2$ wavelengths (where N is an integer $\geq 0$) in order to transform the high reactance presented by receive filter 68 at the transmit frequencies to a value that results in a 50 ohm impedance at the base of radiating element 42. An inductive reactance of approximately 60 ohms at the base of radiating element 40 results in the desired match at the transmit antenna input.

The length of transmission line 48 was adjusted to $0.032 + N/2$ wavelengths (where N is an integer $\geq 0$) in order to transform the high reactance presented by the transmit filter 70 at the receive frequencies so that a 50 ohm match at the base of radiating element 40 results. A capacitive reactance of approximately 80 ohms at the base of radiating element 42 results in the desired match at the receive antenna input.

Figure 4:
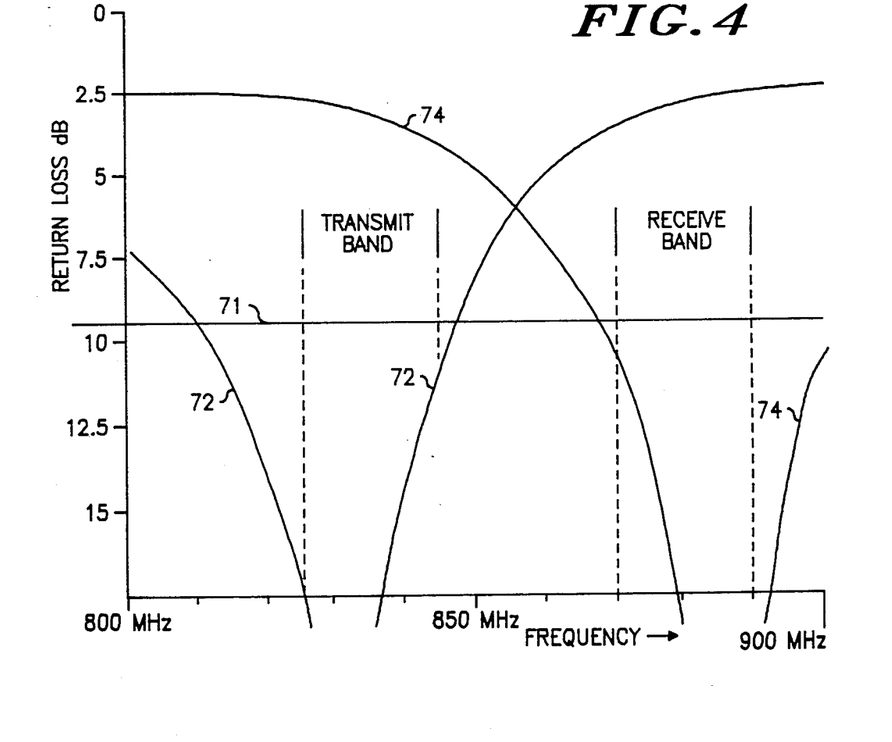
FIG. 4 is a graph of return loss versus frequency for each antenna input.

FIG. 4 illustrates two graphs in which the return loss in decibels is plotted versus frequency. The response of the transmit and receive inputs are indicated on the graph. A horizontal line 71 representing a standing wave ratio (SWR) of 2:1 is shown. The area below line 71 represents a SWR of less than 2:1. Graph line 72 illustrates return loss versus frequency for the transmit antenna input and graph line 74 illustrates return loss versus frequency for the antenna receive input. It will be noted by referring to the graphs that both the transmit and receive antenna inputs have return losses which correspond to a standing wave ratio of less than 2:1.

The internal antenna provides a receiver input coupled to a receiver filter which is matched to the characteristic impedance of the filter in the receive frequency range and a transmitter input coupled to a transmitter filter which is matched to the characteristic impedance of the filter in the transmit frequency range. The reactance presented by each filter for frequencies outside its passband is utilized to achieve the desired impedance for the antenna inputs.

Because the present antenna provides separate matched receive and transmit inputs, additional circuitry such as a duplexer or matching circuits is not needed in order to utilize the antenna for receiving and transmitting at separated frequencies. This antenna permits dual band operation of what is essentially a narrow band antenna.

Figure 5:
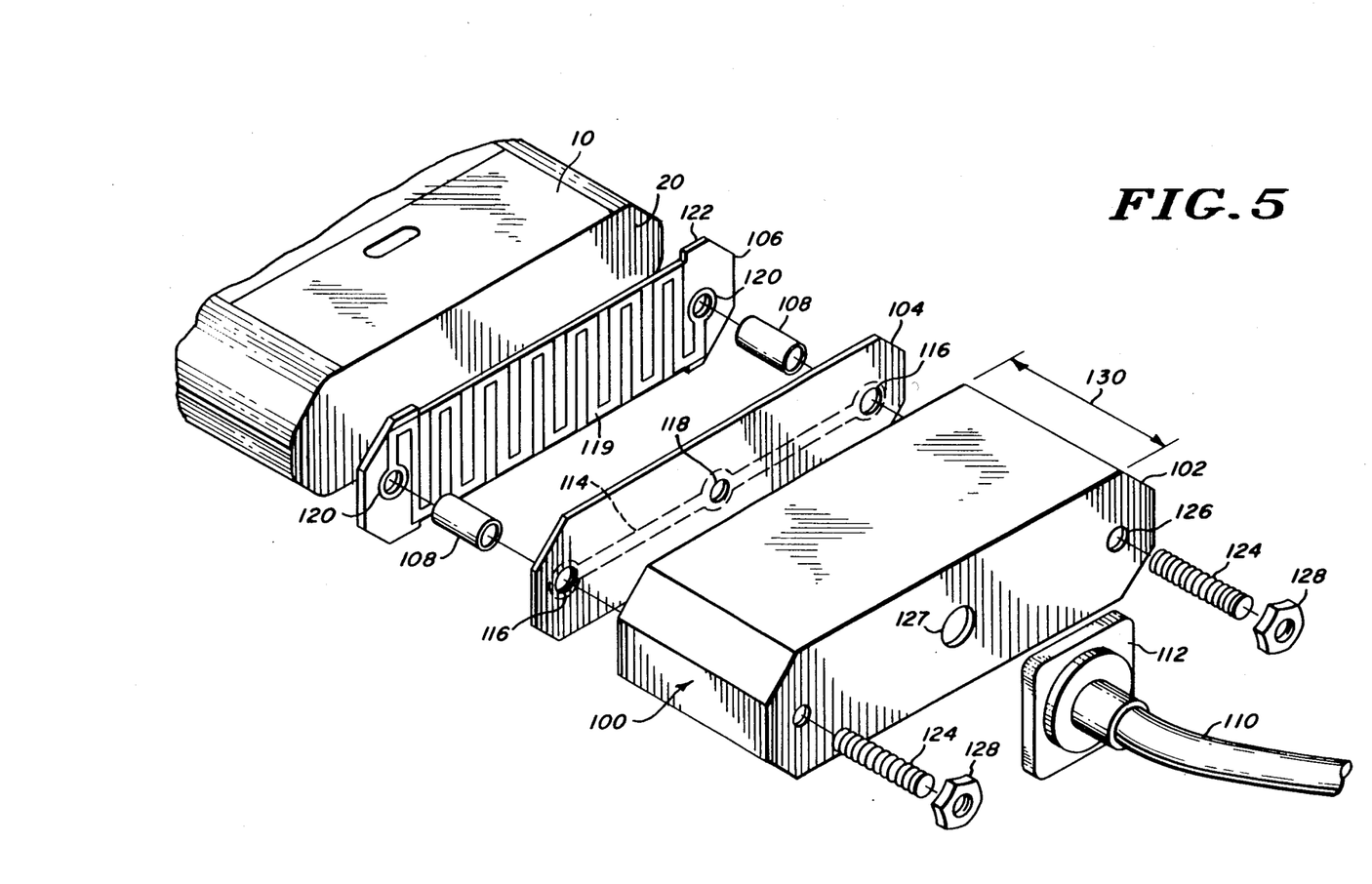
FIG. 5 is an exploded perspective view of an antenna coupler according to the present invention.

Referring to FIG. 5, antenna coupler 100 according to the present invention is shown in an exploded view. The coupler includes a conductive shield 102 which is hollow and receives printed circuit boards 104 and 106 which are spaced apart by metal cylinders 108. A coaxial cable 110 is mounted to the end of shield 102 by a conventional coaxial fastener 112.

Printed circuit board 104 is mounted to the inside surface of the end of shield 102 and has a conductive pattern 114 disposed upon the surface not seen in FIG. 5. The conductive pattern 114 extends between holes 116 in board 104 and encircles holes 116 and a center hole 118. A center pin (not shown) of coax fastener 112 projects through hole 127 and hole 118 and is soldered to pattern 114. The outer shield of coax 110 is coupled to the conductive shield 102. The pattern 114 cooperates with the end of shield 102 to define two microstrip transmission lines which extend outward to holes 116.

Printed circuit board 106 has a serpentine conductive pattern 119 extending between holes 120. Projecting portions of board 106 define tabs 122 which serve to space pattern 119 away from the sides of shield 102. The ends of the conductive pattern 119 are coupled to the ends of pattern 114 by the metal cylinders 108.

Threaded rods 124 which are made of an insulating material project through holes 126, 116, through cylinders 108, and threadingly engage holes 120 in printed circuit board 106. The threaded rods captivate printed circuit board 106 by cylinders 108 to printed circuit board 104. Nuts 128 secure the rods to the end of shield 102 thereby mounting the elements within the shield.

Shield 102 is dimensioned to receive the bottom 20 of radio 10 and a portion of the radio adjacent to the bottom. The length, as indicated by arrow 130, of the shield 102 is such that when shield 102 is positioned to cover the bottom portion of radio 10 it extends beyond the ground plane formed by metal plate 22 (see FIG. 2).

The serpentine pattern 119 on printed circuit board 106 cooperates with the ground plane provided by the end of shield 102 to define a transmission line or resonator which is coupled to coaxial cable 110 by cylinders 108 and the transmission lines 114 on printed circuit board 104. This provides a balanced coupling system between pattern 119 and coax 110.

It will be apparent that when shield 102 engages the bottom of radio 10 that the radiating elements 40 and 42 become shielded thereby preventing radiation from the internal antenna. Preferably the shield 102 extends beyond the metal plate 22 by a distance corresponding to ¼ wavelength at the center design frequency so that the shield in conjunction with the metallic radio housing functions as a open circuited ¼ wavelength transmission line which provides a low impedance between the shield 102 and the metal plate 22 thereby further enhancing the ability of the shield to prevent radiation from the internal antenna.

An important aspect of the present invention is that the impedance match provided to the transmitter and receiver of the radio by the internal antenna is maintained while the shield is in use. Those skilled in the art will appreciate that substantial impedance changes normally accompany major disruptions of the near field of an antenna.

The present invention recognizes this problem and provides a solution which involves changing the effective electrical length of the transmission line on printed circuit board 28 due to the presence of shield 102. The phase velocity V for a transmission line is given by the formula $V = 1/\sqrt{LC}$ where L and C are the respective inductance and capacitance per unit length of the transmission line. For an ideal transmission line, the same impedance presented at one end of the line would be observed at ½ wavelength and 1 wavelength. Instead of changing the physical length of a transmission line to achieve an additional ½ wavelength, the phase velocity V of the transmission line could be reduced by ½. This could be accomplished by increasing the per unit length inductance, capacitance, or a combination of both so that the LC product increased by a factor of 4.

This principal is utilized in the present invention with respect to the serpentine transmission line 30 on printed circuit board 28. In the preferred embodiment of this invention the transmission line is approximately ½ wavelength at the center design frequency (not enclosed by the shield). Placing the shield about this transmission line increases the per unit capacitance primarily due to the capacitance between the edge portions 31 of the serpentine transmission line pattern and the conductive walls of the shield 102. The cumulative length of the edge portions 31 and the distance between same and the walls of shield 102 primarily determine the increase in capacitance of the transmission line. In the present invention, these factors are selected to increase the capacitance by a factor of 4 when the shield is in place. This causes a corresponding reduction in the phase velocity V by a factor of two. Thus, the transmission line defined by serpentine pattern 30 is approximately ½ wavelength when the shield is not in place and approximately 1 wavelength when the shield is in place. Because an integral ½ wavelength change is involved, the impedance reflected by the transmission line 30 to elements 40 and 42 are substantially unchanged when the shield is utilized. Thus, the match to the transmit and receive inputs to the internal antenna remain substantially unaffected even in the presence of the shield.

The transmission line formed by pattern 119 on printed circuit board 106 within shield 102 is preferably substantially identical to the pattern 30 on printed circuit board 28. This results in each having the same electrical length and having electrical and magnetic fields which closely approximate each other. This condition provides the tightest coupling and lowest loss for coupling of energy between the two transmission lines. The fields normally associated with radiating elements 40 and 42 are limited due to the shielding of shield 102. Printed circuit board 28 and 106 are in close proximity when the shield is in place to establish good coupling between same.

Figure 6:
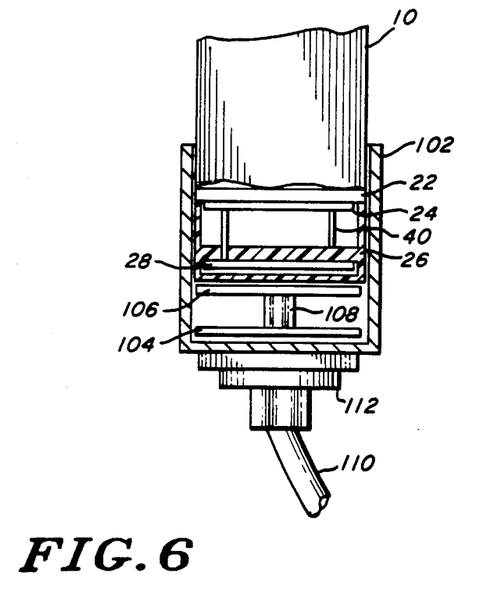
FIG. 6 is a side elevational view with portions shown cut away of the radio seated within the coupler shown in FIG. 5.

FIG. 6 illustrates a side elevational view of radio 10 with shield 102 engaging the bottom portion of the radio and wherein certain portions are shown cut away for clarity. Preferably the housing of radio 10 opposite the walls of shield 102 which extend beyond ground plane 22 are conductive so that the extending portion of the shield appears as an open circuited transmission line of ¼ wavelength to aid in further suppressing possible radiation by elements 40 and 42.

Figure 7:
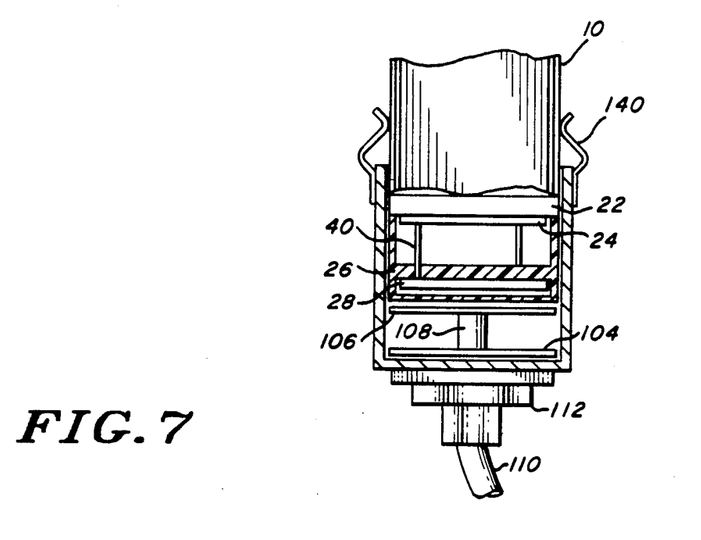
FIG. 7 illustrates an alternative embodiment of a coupler with the radio seated within it.

FIG. 7 illustrates an alternative embodiment of a shield according to the present invention in which the same numerals represent like elements. This alternative embodiment differs only in that a plurality of springy metal contacts 140 extend from shield 102 to engage and establish contact with conductive portions of radio 10. These are utilized to provide a common ground potential for the shield and radio and also enhance the suppression of radiation by the internal antenna.

Although the exemplary embodiment of this invention utilizes a change in wavelength from ½ to 1 wavelength to maintain a matched condition for the transmitter and receiver inputs to the internal antenna system while providing an efficient coupling to an external antenna by means of coaxial cable 110, it will be apparent that this same principal could equally apply to transmission lines having a different wavelength. For example, a portable radio having an antenna system which utilizes a ¼ wavelength transmission line could be transformed in the presence of the shield to a ¾ wavelength transmission line and maintain the same approximate matched condition. In this case (¼ to ¾), the phase velocity would have to decrease to ⅓ V so that the product of LC increases by a factor of 9.

Although embodiments of the present invention have been described and illustrated in the drawings, the scope of the invention is to find by the claims which are appended hereto.

What is claimed is:

1. An antenna coupler for coupling a portable radio having an attached antenna system to an external transmission line, the attached antenna system having at least one radiating element and a first transmission line disposed adjacent to an exterior wall of the radio, the coupler comprising:
    a conductive shield dimensioned to enclose a portion of the radio, said portion containing the first transmission line and said radiating element, the shield inhibiting radiation by the radiating element;
    resonator means disposed in said shield for coupling energy between the external transmission line and the first transmission line when the shield encloses said portion of the radio;
    means for connecting said resonator means to the external transmission line;
    said shield dimensioned so that when it encloses said portion the phase velocity of the first transmission line decreases to approximately V/N where N is an integer $\geq 2$, and V is the phase velocity of the first transmission line with the shield not enclosing said portion.

2. The antenna coupler according to claim 1 wherein said shield comprises a conductive sleeve and an end wall enclosing one end of the sleeve.

3. The antenna coupler according to claim 1 wherein said attached antenna system of the radio includes conductive metal areas which define a reference potential for said antenna system, and further comprising means for establishing electrical connection between said shield and said areas.

4. The antenna coupler according to claim 2 wherein said sleeve extends along the radio and cooperates with the radio to form an open circuit transmission line.

5. The antenna coupler according to claim 1 wherein said resonator means comprises a second transmission line positioned adjacent the first transmission line when said shield encloses said portion of the radio, said second transmission line disposed in a plane parallel to the plane of said first transmission line.

6. The antenna coupler according to claim 5 wherein said second transmission line has an electrical length substantially equal to the electrical length of said first transmission line with said shield enclosing said portion of the radio.

7. The antenna coupler according to claim 5 wherein said connecting means comprises third and fourth transmission lines each having one end connected to said external transmission line and the other ends of said third and fourth transmission lines connected respectively to the opposite ends of said second transmission line.

8. The antenna coupler according to claim 2 wherein said first transmission line comprises a serpentine conductive pattern having a plurality of segments parallel to said sleeve of the shield, the cumulative length of said segments and the distance between said segments and said sleeve selected to cause the capacitance per unit length of said first transmission line to increase to approximately $N^2C$, where N is an integer $\geq 2$ and C is the capacitance per unit length of the first transmission line with the shield not enclosing said portion of the radio.

9. In an antenna system for a portable radio, the system having a certain input impedance at a certain frequency of operation and having antenna components enclosed within a portion of the radio including a radiating element and a first transmission line connected to the radiating element, the improvement comprising:
   means for enclosing said portion of the radio containing said radiating element and first transmission line to prevent radiation by the radiating element from escaping the enclosing means;
   resonator means disposed in said enclosing means for coupling energy between said first transmission line and an external transmission line when said enclosing means encloses said portion of the radio, said enclosing means and resonator means cooperating with the radiating element and first transmission line to keep said certain input impedance from substantially changing when said enclosing means encloses said portion of the radio, said enclosing means when enclosing said portion of the radio causing the electrical length of said first transmission line to increase to approximately $N \times L$ without the need for manual turing, where N is an integer $\geq 2$ and L is the electrical length of the first transmission line with the enclosing means not enclosing said portion of the radio.

10. The antenna system according to claim 9 wherein said enclosing means when enclosing said portion of the radio causes the phase velocity of the first transmission line to decrease to approximately $V/N$, where N is an integer $\geq 2$ and V is the phase velocity of the first transmission line with the enclosing means not enclosing said portion of the radio.

11. The antenna system according to claim 9 wherein said enclosing means comprises a conductive shield having a sleeve and an end wall sealing one end of the sleeve.

12. The antenna system according to claim 11 further comprising means for making electrical connection between said shield and a conductive area of said radio which provides a reference potential for said antenna system.

13. The antenna system according to claim 11 wherein said sleeve is disposed about said portion of the radio forming an open circuit transmission line relative to said portion of the radio.

14. The antenna system according to claim 11 wherein said resonator means comprises a second transmission line disposed within said shield and positioned to be adjacent to said first transmission line when said enclosing means encloses said portion of the radio.

15. The antenna system according to claim 14 wherein said second transmission line has the same effective electrical length as said first transmission line when said enclosing means encloses said portion of the radio.

16. The antenna system according to claim 14 further comprising third and fourth transmission lines each having one end connected to an end of said second transmission line and having the other ends of said third and fourth transmission lines connected to the external transmission line.

17. A method for simultaneously disabling an internal antenna system within a portable radio and coupling the radio to a remote external antenna, the internal antenna system including a radiating element and a first transmission line connected to the radiating element, the method comprising the steps of:
   enclosing the portion of the radio containing the radiating element and the first transmission line with a shield to prevent radiation from the radiating element;
   coupling a second transmission line to said first transmission line by disposing said second transmission line substantially adjacent said first transmission line, said second transmission line being coupled to the remote antenna;
   causing the electrical length of said first transmission line, in response to said shield enclosing said portion of the antenna, to increase to approximately $N \times L$, where N is an integer $\geq 2$ and L is the electrical length of the first transmission line with the shield not enclosing said portion of the radio.

18. The method according to claim 17 further comprising the step of causing the phase velocity of the first transmission line to decrease to approximately $V/N$ when the shield encloses said portion of the radio, where N is an integer $\geq 2$ and V is the phase velocity of the first transmission line with the shield not enclosing said portion of the radio.

* * * * *

UNITED STATES PATENT AND TRADEMARK OFFICE
CERTIFICATE OF CORRECTION

PATENT NO. : 4,740,794

DATED : April 26, 1988

INVENTOR(S) : Phillips et al.

It is certified that error appears in the above-identified patent and that said Letters Patent is hereby corrected as shown below:

Column 9, line 30, "turing" should be --tuning--.

Signed and Sealed this

First Day of November, 1988

*Attest:*

DONALD J. QUIGG

*Attesting Officer*   *Commissioner of Patents and Trademarks*